Patented Nov. 15, 1938

2,136,450

UNITED STATES PATENT OFFICE 2,136,450

PREPARATION OF PIGMENTED PLASTICS

Barnard M. Marks, Arlington, N. J., assignor, by mesne assignments, to E. I. du Pont de Nemours & Company, Wilmington, Del., a corporation of Delaware No Drawing. Application April 2, 1936, Serial No. 72,445

3 Claims. (Cl. 106—22)

This invention relates to the preparation of pigmented plastics and, more particularly, to the preparation of pigmented polymerized organic compounds of the type used in so-called "turnery" resins and in molding compounds.

Heretofore, difficulty has been experienced when ordinary pigments have been introduced into the liquid monomeric compound which is to be polymerized to a solid resin and yet it is necessary to mix the pigment with the monomer in preparing cast or turnery resins; also, it is sometimes desirable to do this when preparing the polymer in granular form for molding purposes. Particular trouble has been encountered with white pigments for the production of transparent and opaque resins, or pastel shades where the white pigment is combined with a small proportion of colored dye or pigment.

An object of the present invention is to provide a simple and economical process of pigmenting plastics, more particularly polymerized organic compounds. A further object is to provide a process of securing handsome translucent and opaque colorations in white and various pastel shades. A still further object is to provide a process of obtaining such colored products without substantially lowering the softening temperature of the resin formed and without the use of ingredients tending to discolor the resin or inhibit the polymerization reaction. A further object is to provide such a process wherein the pigment is incorporated with the organic compound in liquid substantially unpolymerized state so that cast resins may be produced. Other objects of the invention will be apparent from the description given hereinafter.

The above objects are accomplished according to the present invention by dissolving paraffin wax in the liquid monomeric organic compound, or in a syrup of the monomeric compound having a small proportion of polymer dissolved therein, and then polymerizing the same.

It has been found that, by the use of paraffin wax as a pigment, resins may be obtained which are either translucent or opaque and, in color, pure white, or by the addition of suitable proportions of colored pigment or, preferably, soluble dyestuff, in an infinite variety of tints and shades. Various translucent and opaque shades may be obtained depending upon the proportion of paraffin wax used and the melting point of the paraffin wax; also, various novel effects may be obtained by varying the particular procedure of polymerizing the monomeric compound.

In general, the pigmenting effect of the paraffin wax increases as the melting point of the paraffin wax increases; while a paraffin wax having a melting point as low as 100° F. may be used, the pigmenting effect of those waxes having a melting point of at least 120° F. is so much greater that it is more practical to use them; further, the danger of the paraffin wax in the resin melting in summer sunlight is avoided by using waxes having a melting point of 120° F. or higher. To obtain a very high pigmenting effect in proportion to the paraffin wax used, a wax having a melting point of 143–145° F., or even higher, is preferred.

The use of paraffin wax as a pigment is particularly advantageous when the monomeric organic compound is to be polymerized in elongated shapes such as rods or tubes, in accordance with the invention disclosed in C. M. Fields U. S. application Serial No. 28,404, filed June 26, 1935, entitled "Polymerization process" issued on October 20, 1936, as U. S. Patent 2,057,674, and in R. T. Fields U. S. application Serial No. 28,403, filed June 26, 1935, entitled "Preparation of polymerized organic compounds" issued on October 20, 1936, as U. S. Patent 2,057,673. Broadly, the procedure disclosed in these applications comprises introducing the liquid monomeric organic compound, either containing or not containing a small proportion of polymer dissolved therein, into an elongated mold closed at one end, applying heat to a narrow zone at the colsed end of the mold until the monomeric compound in that zone is substantially polymerized, and progressively advancing the heating zone along the major axis of the mold at about the rate at which the monomeric compound in the mold is being polymerized while maintaining the liquid ahead of the advancing heating zone at a temperature below that at which the monomeric compound will undergo active polymerization. It is preferred to keep the body of liquid composition under fluid pressure while being polymerized.

In the following specific examples various modifications of the present invention are illustrated with respect to the compound methyl methacrylate which is a typical polymerizable organic compound used in turnery resins and molding compounds. All parts are given by weight:

*Example 1.*—The composition used is:—

|  | Parts |
| --- | --- |
| Methyl methacrylate | 100 |
| Paraffin wax (M. P. 133° to 135° F.) | 1.2 |
| Benzoyl peroxide | 0.1 |

The paraffin wax and benzoyl peroxide are dissolved in the monomeric methyl methacrylate with the aid of heat and the liquid solution is held at 70° C. to 80° C. until it has become syrupy through partial polymerization. It is then placed in a tubular mold of aluminum and of inside diameter of ⅝", which is lowered vertically at a rate of 1.5" per hour into a water bath maintained at 80° C., while at the same time the contents of the mold are subjected to a gas pressure of 175 pounds per square inch. This process of polymerizing is in accordance with the invention disclosed in the above mentioned application of C. M. Fields.

There is formed a rod of polymerized methyl methacrylate of a pure translucent white.

*Example 2.*—The procedure of Example 1, using the composition therein, is carried out except that after the formation of the syrup there is added to it 0.0005 parts of Oil Red O, a soluble dyestuff. The resulting rod is of a bright translucent red color.

*Example 3.*—This is carried out as in Example 1 using the same composition as in Example 1, except that the amount of paraffin wax is 1.5 parts. Due to the increase in proportion of paraffin wax a pure opaque white rod is obtained rather than a translucent white.

*Example 4.*—The procedure of Example 1 is carried out using the same composition, except that the paraffin wax has a melting point of 123—125° F. and the amount of it used is 2.0 parts. With this lower melting point paraffin wax, having a somewhat less pigmenting effect, the proportion used is sufficient to give a pure opaque white rod.

The translucent and opaque pigmentation produced by the paraffin wax appears to be the result of its insolubility in the polymer which causes the wax to separate out during the course of the polymerization in very finely divided form. It has been found that advantage can be taken of this to obtain various novel ornamental effects through the unequal progress of polymerization in the mass of liquid being polymerized. In the C. M. Fields process, when relatively small amounts of paraffin wax, in view of the melting point of the wax, are used, there is obtained a rod or other elongated body in which portions are translucent white while other portions are clear, indicating that polymerization has progressed more rapidly in the clear portions. This is illustrated in the following four examples:

*Example 5.*—The composition used is:

| | Parts |
|---|---|
| Methyl methacrylate | 100 |
| Paraffin wax (M. P. 123–125° F.) | 1 |
| Benzoyl peroxide | 0.1 |

The procedure is carried out as in Example 1. However, in this case the resulting rod is clear throughout its center but translucent white in a zone just within its periphery.

*Example 6.*—The composition used is:

| | Parts |
|---|---|
| Methyl methacrylate | 100 |
| Paraffin wax (M. P. 133–135° F.) | 0.75 |
| Benzoyl peroxide | 0.1 |

The procedure is carried out as in Example 1 but the rod obtained is similar to that described in Example 5. It will be noted that, in this example, the proportion of paraffin wax is somewhat less than in Example 5 due to the fact that it has a higher melting point and hence greater pigmenting effect.

*Example 7.*—The composition used is:

| | Parts |
|---|---|
| Methyl methacrylate | 100 |
| Paraffin wax (M. P. 123–125° F.) | 1.25 |
| Benzoyl peroxide | 0.1 |

The procedure is carried out as in Example 1 but the resulting rod has a translucent zone within the periphery and another translucent zone centrally located along the axis of the rod, the two translucent zones being separated by a transparent zone.

*Example 8.*—The composition used is:

| | Parts |
|---|---|
| Methyl methacrylate | 100 |
| Paraffin wax (M. P. 133–135° F.) | 0.85 |
| Benzoyl peroxide | 0.1 |

The procedure used in Example 1 was followed and the result was similar to that in Example 7 but in this instance the proportion of paraffin wax was somewhat less than that used in Example 7 due to the fact that paraffin wax of a somewhat higher melting point was employed.

When the liquid polymerizable organic compound is polymerized in masses of considerable depth at a rate slow enough to yield masses of polymer free of bubbles, this effect is more pronounced than in the C. M. Fields procedure, as is illustrated in the following example in which a layer by layer polymerization is employed such as disclosed in Glen M. Kuettel U. S. application Serial No. 736,678, filed July 24, 1934, entitled "Preparation of cast resins" issued on December 8, 1936, as U. S. Patent 2,063,315, said application being assigned to the assignee of the present application:

*Example 9.*—The composition used is:

| | Parts |
|---|---|
| Methyl methacrylate | 100 |
| Paraffin wax (M. P. 123–125° F.) | 1.5 |

The paraffin wax is dissolved in the monomer and a sufficient quantity of the resulting liquid to form a layer of a depth of 0.5" is poured into a glass vessel. This vessel is stoppered and placed in an oven maintained at 70° C. At the end of 24 hours the liquid is set up to a hard resin of which the lower part is clear and colorless and the upper part a translucent white, indicating that polymerization progresses more rapidly in the lower part of the layer of the liquid. A second layer of the liquid is similarly poured and polymerized. By repetition of this procedure there is formed a block comprising transparent zones alternating with white translucent zones.

As a variation of the procedure in the above example, the paraffin wax may be omitted from the monomeric methyl methacrylate poured out to form the second and succeeding layers and a novel ornamental effect will be obtained due to the fact that the second layer of monomer dissolves some of the paraffin wax from the solidified first layer, said paraffin wax forming a white translucent zone in the upper portion of the second layer as it polymerizes. The succeeding layers of monomer dissolve the paraffin wax in the same manner and thus a block is created in which the white translucent layers alternating with the opaque layers become progressively less thick and opaque. A variation of this ornamental effect may be obtained by also employing a soluble dyestuff as well as the paraffin wax in the first layer, said soluble dyestuff also being partially dissolved out of the polymerized layer by the succeeding layer of monomer poured thereon so that there results a gradual tapering off of intensity of the coloration due to the dyestuff.

Mottled effects may also be obtained according to the present invention by the use of two different syrups of polymer dissolved in monomer, said syrups being sufficiently viscous so that they can be poured together and only partially stirred. If one of the syrups contains paraffin wax and the other does not, the polymerized mass formed will have a mottled effect due to the incomplete mixing of the two syrups.

The following example illustrates the preparation of a mottled white and transparent molded article:

*Example 10.*—The composition used is:

| | Parts |
|---|---|
| Methyl methacrylate | 100 |
| Paraffin wax (M. P. 133—135° F.) | 1.4 |

The paraffin wax is dissolved in the monomeric methyl methacrylate and 1000 grams of this solution is placed in a closed two gallon can and allowed to polymerize in an oven maintained at 70° C. Polymerization proceeds rapidly and vigorously due to the exothermicity of the reaction and the resulting polymerized mass is filled with bubbles or voids. In the bubble filled polymer formed in about two days, the distribution of paraffin wax, and hence the pigmentation, is irregular. The mass is broken up and molded by application of heat and pressure, giving molded articles which are mottled white and transparent.

Pigmentation by paraffin wax may not only be used in the production of massive polymer as illustrated in the above examples but also in polymer produced directly in pulverulent or granular form as illustrated by the two following examples:

*Example 11.*—The composition used is:

| | Parts |
|---|---|
| Methyl methacrylate | 100 |
| Paraffin wax (M. P. 133—135° F.) | 1.5 |
| Benzoyl peroxide | 1 |

The paraffin wax and benzoyl peroxide are dissolved in the monomeric methyl methacrylate and the solution filtered, if necessary. An aqueous vehicle is used comprising 200 parts of water and 1.25 parts of lauryl sodium sulfate, an emulsifying agent which dissolves in the water. The aqueous vehicle and monomeric methyl methacrylate are mixed and passed through a colloid mill to effect emulsification. The emulsion is then heated in a flask at from 65° to 75° C. and polymerization is substantially complete at the end of 60–75 minutes. The mixture is now diluted with 800 parts of water and there is added to it 10 parts of 0.2 molar aqueous solution of alum. The mixture is warmed and stirred until the emulsified polymer is coagulated, the polymer then being filtered, washed, and dried. An article molded under heat and pressure from the pulverulent polymer thus obtained is of an attractive, uniform, translucent white appearance.

*Example 12.*—The composition used is:

| | Grams |
|---|---|
| Methyl methacrylate | 100 |
| Paraffin wax (M. P. 133—135° F.) | 1.5 |
| Benzoyl peroxide | 1 |

As in the preceding example, the paraffin wax and benzoyl peroxide are dissolved in the monomeric methyl methacrylate. In this instance an aqueous vehicle is made up of:

| | Grams |
|---|---|
| Polymethacrylic acid | 1.0 |
| Monosodium phosphate | 0.29 |
| Disodium phosphate | 1.25 |
| Distilled water | 250.0 |

The polymethacrylic acid, acting as a granulating agent, and the buffer salts (the monosodium and disodium phosphates) are dissolved in the distilled water and the monomer solution is added to the same in a kettle provided with a stirrer and reflux, the stirrer being operated at a speed sufficient to maintain the methyl methacrylate continuously in the form of droplets. The mass is heated at a temperature of 80–82° C. and at the end of about 45 minutes polymerization is complete and the little solid beads or granules of polymer are separated from the aqueous vehicle, washed and dried.

Upon molding the granular polymer thus obtained under heat and pressure an article of attractive, uniform, white translucent appearance is obtained.

It will be understood that the above examples are merely illustrative of the many variations of the present invention which broadly comprises introducing paraffin wax in pigment proportions into a polymerizable organic compound in liquid or syrup state comprised chiefly of monomer, and then polymerizing the organic compound.

Although advantageously used with methyl methacrylate, it will be apparent to those skilled in the art that this invention is applicable generally to polymerizable organic compounds used in the preparation of cast or turnery resins or molding compounds. Such organic compounds are known in the art and a large group of them adapted for use in the present invention are listed in the above referred to application of C. M. Fields. Mixtures of monomers may be used, thereby obtaining interpolymers rather than simple polymers.

It is preferred that the paraffin wax should be of the standard refined type to avoid discoloring effects of impurities and thus to get full advantage of the pure, rich, white pigmenting effect provided by this invention. Throughout the specification the melting points of the paraffin waxes given are the "American" melting points, 3° F. higher than the A. S. T. M. paraffin wax melting points. The "American" melting point is defined in book of A S. T. M. Standards, 1933—part 2—page 836.

The proportion of paraffin wax used will vary depending upon the pigmenting effect desired in the finished product and upon the melting point of the wax used. In general, the proportion will be relatively small, rarely above 2% by weight of the total composition, even when obtaining opaque products, and correspondingly less when translucent products are desired. The use of approximately the minimum amount of paraffin wax for any desired pigmenting effect is preferred as in this way any lowering of the softening temperature of the finished product is reduced to a minimum. The use of these paraffin waxes does not effect any appreciable lowering of the softening temperature of the resin in any event, particularly when the higher melting point paraffin waxes are employed.

To illustrate the approximate range of specific proportions of paraffin wax in compositions to obtain various pigmenting effects, the following results are given showing the use of various percentages of paraffin wax of various melting points in preparing rods in accordance with the procedure of Example 5:

| Percentage paraffin in monomer | Melting point of paraffin 123-125° F. | Melting point of paraffin 133-135° F. | Melting point of paraffin 143-145° F. |
|---|---|---|---|
| 0.15 | | | Clear. |
| 0.25 | | | Center of rod cloudy. |
| 0.38 | | Center of rod cloudy. | |
| 0.50 | Clear. | | Translucent ring. |
| 0.75 | | Translucent ring and center. | |
| 1.00 | Translucent ring. | | Opaque. |
| 1.50 | | Opaque. | |
| 2.00 | Opaque. | | |

It has been found that when the organic compound is polymerized at temperatures above the melting point of the paraffin wax used, and for reasons of economy and time this procedure generally will be used, the paraffin wax separates in the form of particles ordinarily too small to be seen as individuals by the naked eye or even by a small microscope, and the pigmenting effect is soft, rich, and uniform. On the other hand, polymerization may be conducted at temperatures below the melting point of the paraffin wax, in which case the paraffin wax separates probably as solid particles or crystals; the particles are relatively coarse and easily discernible as individuals and their covering power is correspondingly low so that the effect of their presence upon the appearance of the resin is quite different, resembling more nearly that of ground glass shaken in water.

The present invention is useful in obtaining white pigmentation in polymerized resins in that it eliminates the difficulties and complications associated with the use of mineral pigments. Furthermore, it provides a white pigmentation of great purity of color and unusual attractiveness. The hardness and the softening temperature of the resins are not appreciably altered by the presence of the paraffin wax. Also, used in conjunction with suitable soluble dyestuffs, the paraffin wax yields pure pastel tints not heretofore obtainable by any known combination of mineral pigments.

As many apparently widely different embodiments of this invention may be made without departing from the spirit and scope thereof, it is to be understood that the invention is not limited to the specific embodiments thereof except as defined in the appended claims.

I claim:

1. In the preparation of pigmented polymerized methyl methacrylate, the steps comprising dissolving paraffin wax in pigment proportions but not in substantial excess of 2% by weight of the total composition in monomeric methyl methacrylate, and then polymerizing said monomeric methyl methacrylate.

2. In the preparation of pigmented polymerized methyl methacrylate, the steps comprising dissolving paraffin wax having a melting point of at least 120° F. in pigment proportions but not in substantial excess of 2% by weight of the total composition in monomeric methyl methacrylate, and then polymerizing said monomeric methyl methacrylate.

3. In the preparation of pigmented polymerized methyl methacrylate, the steps comprising dissolving paraffin wax in pigment proportions but not in substantial excess of 2% by weight of the total composition in monomeric methyl methacrylate, emulsifying said liquid in an aqueous medium containing a granulating agent, subjecting said emulsion to an elevated temperature until said monomeric methyl methacrylate is substantially completely polymerized, coagulating the emulsified polymer thus formed, and separating same from the aqueous medium.

BARNARD M. MARKS.